United States Patent [19]
Speiser et al.

[11] 3,971,927
[45] July 27, 1976

[54] MODULAR DISCRETE COSINE TRANSFORM SYSTEM

[75] Inventors: Jeffrey M. Speiser; Herbert M. Federhen, both of San Diego, Calif.

[73] Assignee: The United States of America as represented by the Secretary of the Navy, Washington, D.C.

[22] Filed: Nov. 3, 1975

[21] Appl. No.: 628,433

[52] U.S. Cl. .............................. 235/186; 235/156; 324/77 B
[51] Int. Cl.² ..................... G06G 7/22; G06F 15/34
[58] Field of Search ........ 235/186, 156, 152, 150.5; 324/77 B, 77 D; 178/DIG. 3

[56] References Cited
UNITED STATES PATENTS

| | | | |
|---|---|---|---|
| 3,803,391 | 4/1974 | Vernet | 235/152 |
| 3,881,097 | 4/1975 | Lehmann et al. | 235/156 |
| 3,920,974 | 11/1975 | Means | 235/152 |
| 3,925,648 | 12/1975 | Speiser et al. | 235/156 |

Primary Examiner—Joseph F. Ruggiero
Attorney, Agent, or Firm—Richard S. Sciascia; Ervin F. Johnston; John Stan

[57] ABSTRACT

Apparatus for performing an even discrete cosine transform (EDCT) on an input signal of size 2N, with components for an EDCT of size N, which comprises four similar modules, for performing an extended discrete Fourier transform (EDFT) on their input signals. Each EDFT module comprises means for generating the signal $$e^{-\frac{i\pi s^2}{2N}}$$

$s = -(N-1), \ldots, (N-1)$, an input multiplier, a transversal filter, and an output multiplier. The apparatus further comprises a switching means, means for generating a signal $(-1)^n$, two input multipliers, two complex attenuators, two other means for generating a signal, four output multipliers, two signal summers, and two circuits for taking the real part of an input signal.

3 Claims, 3 Drawing Figures

APPARATUS FOR PERFORMING AN EDCT OF LENGTH N, INCLUDING MODULE TO PERFORM A DFT OF SIZE 2N OF A DATA BLOCK OF SIZE N EXTENDED BY N ZEROS.

GENERAL DFT IMPLEMENTED VIA A CZT USING A TRANSVERSAL FILTER

MODULAR DISCRETE COSINE TRANSFORM SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is useful in signal processing.

The basic concept behind the invention is to take an expression for a long discrete cosine transform and to break it into smaller parts, four smaller parts, using four modules, which are evaluated by the same kind of operation. The critical part is that, in order to break it into smaller parts, complex multiplications have to be utilized. Use is made of the fact that the exponential function has an addition theorem, namely, $e^{ia} e^{ib} = e^{i(a+b)}$. The cosine function has a more complicated addition theorem.

This invention involves working through complete Fourier transforms and then taking the real parts when the operation is all done, rather than taking the real parts at an early stage, as is generally done in the prior art. The prior art process does not permit separation into simpler operations.

In order to calculate the equivalent of a discrete Fourier transform of a mirror symmetry extended data block, it is not necessary to generate the physical replicas of the image mirror points.

That is, the data points do not have to be physically replicated. In fact, the apparatus is designed to avoid the replication, since that would require extra memories and associated memory operations. The equivalent of taking the Fourier transform of an extended data block, extended in mirror symmetry, is equivalent mathematically to extending the real part of a Fourier transform so that it is partly filled with zeroes.

More specifically, this invention relates to apparatus for the implementation of the even discrete cosine transform (EDCT). The specific structure chosen permits the use of four EDFT modules to compute a double-length transform, with twice the throughput rate of the individual modules. If the EDFT is chosen to be used as a module for computing the EDCT, then more of the same modules may be used to perform a larger transform, a double length transform, as well as the shorter, regular length, module.

The utility of the EDCT for data compression has been described in the prior art. Reference is directed specifically to: [1] Means, R. W., Whitehouse, H. J., et al, *Image Transmission Via Spread Spectrum Techniques*, ARPA Quarterly Technical Report, March 1 – June 1, 1973, Order Number 2303, Code Number 3G10, published by the Naval Undersea Center, San Diego, Calif., 92106; [2] Means, R. W., Speiser, J. M., Whitehouse, H. J., et al, *Image Transmission Via Spread Spectrum Techniques*, ARPA Quarterly Technical Report, June 1 – Oct. 1, 1973, Order Number 2303, Code Number 3G10, the same publisher; and [3] Ahmed, N., Natarajan, T., and Rao, K. R., On *Image Processing and a Discrete Cosine Transform*, IEEE Transactions on Electronic Computers, Jan. 1974, pp. 90–93.

Several different serial-access implementations for high speed computation of the EDCT have also been described, for example, in the technical note [4] Speiser, J. M., entitled *High Speed Serial Access Implementation For Discrete Cosine Transforms*, NUC TN 1265, Jan. 8, 1974, published by the Naval Undersea Center, San Diego, Calif. 92106.

Implementations using charge coupled device (CCD) transversal filters are particularly attractive [2] for applications which require low weight, small size, low power consumption, and controllable clocking of the computation. Present CCD transversal filters perform well at shift rates of up to about $5 \times 10^6$ samples per second. This is too slow by a factor of two to handle conventional television signals using the prior art EDCT architectures. This invention includes a subdivision of the computation tasks to permit greater parallelism in the hardware, to increase both the throughput and transform size implementable with a fixed set of transversal filter and chirp read-only memory modules.

SUMMARY OF THE INVENTION

This invention relates to apparatus for performing an even discrete cosine transform (EDCT) on an input signal of size 2N, with components for an EDCT of size N. The apparatus comprises switching means, having an input and two alternately energized outputs, a first output and a second output, for distributing data points $g_0, \ldots, g_{2N-1}$ of an input signal, the last N data points, $g_N, \ldots, g_{2N-1}$, being made zeroes. Means are provided for generating a signal $(-1)^n$, $n = 0, 1, \ldots, 2N-1$.

A first input multiplier has two inputs, one connected to the first output of the switching means and the other to the signal generating means.

A second input multiplier has two inputs, one connected to the second output of the switching means and the other to the signal generating means.

A first EDFT module whose input is connected to the output of the first input multiplier, performs a discrete Fourier transform (DFT) on its input signal. A second EDFT module has its input connected to the first output of the switching means. A third EDFT module has its input connected to the second input of the switching means. A fourth EDFT module has its input connected to the output of the second input multiplier. The second, third, and fourth EDFT modules are substantially identical to the first EDFT module.

A first complex attenuator, whose input is connected to the output of the first EDFT module, shifts the phase of a signal at its input by $-\pi/4$ radians.

A second means for generating a signal, which may be a read-only memory, generates a signal $$e^{-\frac{i\pi k}{4N}},$$

$k = 0, 1, \ldots, 2N-1$.

A first output multiplier has inputs which are connected to the outputs of the first complex attenuator and the second means for generating a signal. A second output multiplier has inputs which are connected to the outputs of the second EDFT module and the second signal generating means.

A second complex attenuator, whose input is connected to the output of the fourth EDFT module, shifts the phase of a signal at its input by $-3\pi/4$ radians.

A third means for generating a signal which may also be a read-only memory, generates a signal $$e^{-\frac{i3\pi k}{4N}}.$$

A third output multiplier has inputs which are connected to the outputs of the third EDFT module and the third signal generating means. A fourth output multiplier has inputs which are connected to the outputs of the third signal generating and the second complex attenuator.

A first signal summer has as its two inputs the outputs of the second and third output multipliers. A first circuit for taking the real part of an input signal is connected to the output of the first signal summer, the output signal being $G_0, \ldots, G_{N-1}$, the first N terms of the even discrete cosine transform of the input signal.

A second signal summer has as its two inputs the outputs of the first and fourth output multipliers. A second circuit for taking the real part of an input signal is connected to the output of the second signal summer, the output signal being $G_N, \ldots, G_{2N-1}$, the last N terms of the even discrete cosine transform of the input signal.

In the apparatus of this invention each EDFT module may comprise means for generating a signal $$e^{-\frac{i\pi s^2}{2N}},$$

$s = -(N-1), \ldots, (N-1)$. A module input multiplier has as its two inputs the input signal and the signal $$e^{-\frac{i\pi s}{2N}}.$$

A transversal filter, having $2N-1$ taps and tapped according to the relationship $$e^{\frac{i\pi s^2}{2N}},$$

has its input connected to the output of the module input multiplier. Each EDFT module also includes a module output multiplier, whose two inputs comprise the output of the transversal filter and the signal $$e^{-\frac{i\pi s}{2N}}.$$

The module input and output multipliers may comprise read-only memories.

OBJECTS OF THE INVENTION

An object of the invention is to provide apparatus for the implementation of an even discrete cosine transform using four identical modules as key components.

Another object of the invention is to provide an apparatus which can compute a double length transform with twice the throughput rate of the individual modules.

A further object of the invention is to provide apparatus which permits increasing the transform size implementable with a fixed set of transversal filter and chirp read-only memory modules.

Other objects, advantages and novel features of the invention will become apparent from the following detailed description of the invention, when considered in conjunction with the accompanying drawings, wherein:

DESCRIPTION OF THE PREFERRED EMBODIMENTS

Figure 1:
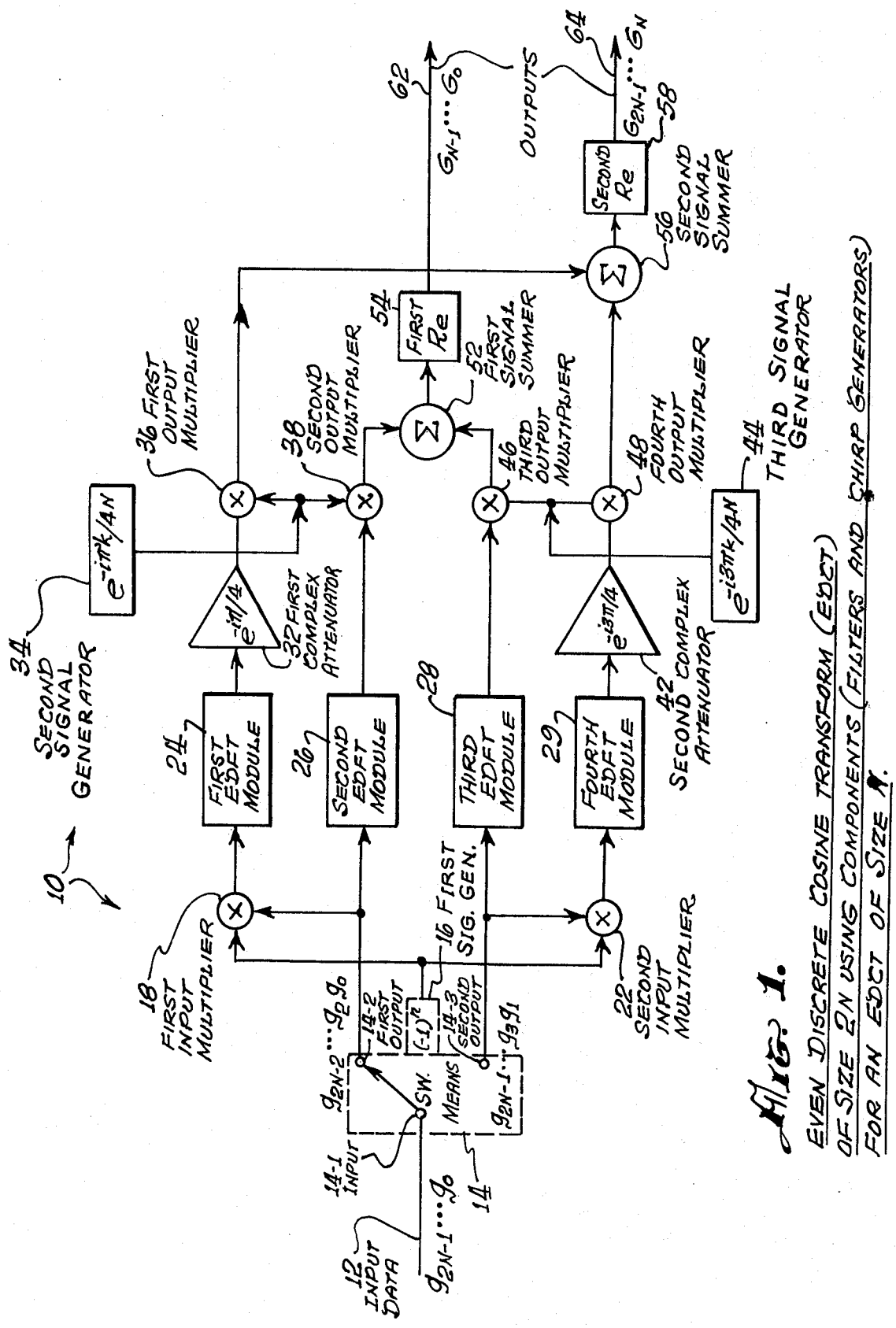
FIG. 1 is a block diagram showing the apparatus of this invention for performing the even discrete cosine transform (EDCT) of size 2N, using components, such as filters and chirp generators, for an EDCT of size N.

Referring now to FIG. 1, this figure illustrates an apparatus 10 for performing an even discrete cosine transform (EDCT) on an input signal 12 of size 2N, with components for an EDCT of size N. A switching means 14, having an input 14-1 and two alternately energized outputs, a first output and a second output, 14-2 and 14-3, distributes data points $g_0, \ldots, g_{2N-1}$ of an input signal 12, data points $g_N, \ldots, g_{2N-1}$ being made zeroes. With each data point, beginning with $g_0$ at the top position 14-2 of the switch 14, the switch alternates in position.

Means 16 are provided for generating a signal $(-1)^n$, $n = 0, 1, \ldots, 2N-1$.

A first input multiplier 18 has its two inputs connected to the first output 14-2 of the switching means 14 and to the signal generating means 16. A second input multiplier 22 has its two inputs connected to the second output 14-3 of the switching means 14 and to the signal generating means 16.

The first and second input multipliers, 18 and 22, may be general analog multipliers, or they may be simpler multipliers, due to the fact that one of the factors, from signal generating means 16, has a magnitude of one. This results in the product being equal numerically to the other factor.

A first EDFT module 24, whose input is connected to the output of the first input multiplier 18, performs a discrete Fourier transform (DFT) on its input signal. A second EDFT module 26, substantially identical to the first module 24, has its input connected to the first output 14-2 of the switching means 14. A third EDFT module 28, substantially identical to the first module 24, has its input connected to the second output 14-3 of the switching means 14. A fourth EDFT module 29, substantially identical to the first module 24, has its input connected to the output of the second input multiplier 22.

A first complex attenuator 32 whose input is connected to the output of the first EDFT module 24, shifts the phase of a signal at its input by $-\pi/4$ radians.

In a base band implementation, multiplication by a complex weight is involved. Complex multiplication at base band may be implemented using four attenuators, two of them driven by the real part of the signal, and two of them driven by the imaginary part of the signal. There are essentially four attenuators and two summers and differential amplifiers. Multiplication by $$e^{-\frac{i\pi}{4}}$$

is equivalent to multiplying by $(1-i)/\sqrt{2}$. It is to be noted that in the attenuator implementation, the magnitude of the real part attenuation and the imaginary part attenuation is the same.

In implementations of the type disclosed herein, a scale factor is ignored, that is, the overall gain of the device is ignored. Therefore, the complex attenuator 32, in the base band implementation, comprises a pair of differential amplifiers or summers. A multiplication by $(1-i)(a+ib)$ results in an output comprising a real part of $a+b$ and an imaginary part of $b-a$. This is equivalent to taking the sum and difference of the components of the input signal $a+ib$.

A second means for generating a signal 34 generates a signal $$e^{-\frac{i\pi k}{4N}},$$

$k = 0, 1, \ldots, 2N-1$.

A first output multiplier 36 has its inputs connected to the outputs of the first complex attenuator 32 and the second signal generating means 34. A second output multiplier 38 has its inputs connected to the outputs of the second EDFT module 26 and the second signal generating means 34.

A second complex attenuator 42, whose input is connected to the output of the fourth EDFT module 29, shifts the phase of a signal at its input by $-3\pi/4$ radians. A third means for generating a signal 44 generates a signal $$e^{-\frac{i3\pi k}{4N}}.$$

A third output multiplier 46 has its inputs connected to the outputs of the third EDFT module 28 and the third signal generating means 44. A fourth output multiplier 48 has its inputs connected to the outputs of the second complex attenuator 42 and the third signal generating means 44.

A first signal summer 52 has its two inputs connected to the outputs of the second and third output multipliers, 38 and 46. A first circuit 54 for taking the real part of an input signal is connected to the output of the first signal summer 52, the output signal 62 being $G_0, \ldots, G_{N-1}$, the first N terms of the even discrete cosine transform of the input signal 12.

A second signal summer 56 has as its two inputs the outputs of the first and fourth output multipliers, 36 and 48. A second circuit 58 for taking the real part of an input signal is connected to the output of the second signal summer 56, the output signal 64 being $G_N, \ldots, G_{2N-1}$, the last N terms of the even discrete cosine transform of the input signal 12.

Some of the blocks shown in FIG. 1 can be realized in highly simplified form. This applies specifically to the two circuits for taking the real part of an input signal, 54 and 58. In the most usual use with base band implementations of the complex arithmetic, where separate manipulation is done on the real part and the imaginary part of the output signal, the operation of taking the real part simply involves using the real part connection. It does not involve a separate hardware component. This is well known in the prior art.

At the output 62 are generated the first half of the 2N output points; at the output 64 are generated the second half of the output points. The N output points at each output 62 and 64 are available at the same time. They may be accumulated in any desired fashion, using switching circuits, buffers, etc.

In many practical applications, only the first N points, $G_0, \ldots, G_{N-1}$, are to be used. For example, perhaps the most important application of the cosine transform at present is in image data compression to result in image bandwidth reduction. In that specific application only the low indexed points of cosine transform coefficients are used, that is, those generated at output 62, where virtually all of the energy is contained.

For this application, the output points, $G_N, \ldots, G_{2N-1}$, are not required, and, therefore, that part of the circuitry 10 which is associated only with output 64, such as, for example, circuit 58, will not be required.

Figure 2:
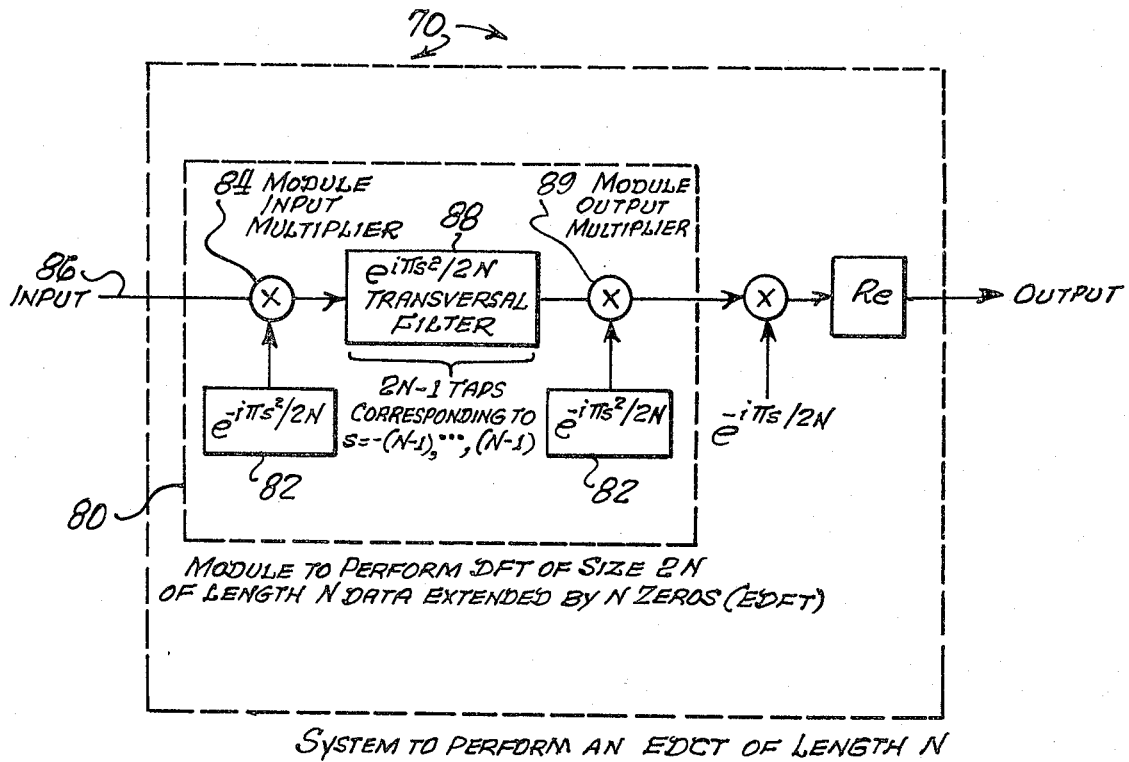
FIG. 2 is a block diagram of an apparatus for performing an EDCT of length N, including a module for performing a discrete Fourier transform (DFT) of size 2N of a data block of size N extended by N zeroes.

A system 70 to compute the even discrete cosine transform (EDCT) of length N, implementing equations derived and explained in reference [4], is shown in FIG. 2. It differs from serial-access implementations of the odd discrete cosine transform (ODCT), given in reference [2], primarily in the sinusoidal multiplication following the chirp postmultiplication. Despite this slight complication the EDCT was selected for modular decomposition rather than the ODCT because an odd-length extension of a data block can only be subdivided into an even length data block and an odd length data block while an even length extension of a data block can be subdivided into two data blocks of the same length in order to permit simultaneous computation by similar modules.

Since intermediate complex quantities need to be preserved in the modular decomposition, the complex extended discrete Fourier transform (EDFT) portion 80 of FIG. 2 was chosen as the basic module. This module computes N points of a length 2N discrete Fourier transform (DFT) of the extension of the data sequence by N zeroes.

The term extended is used with the discrete Fourier transform (EDFT) because the basic module computes N points of a length 2N discrete Fourier transform. The basic module is extended and even. Ordinarily it is assumed that as many transform coefficients are being taken as the data block length. The EDFT modules of this invention compute only half as many coefficients as the data block length. The module computes N points of a length 2N discrete Fourier transform.

The interconnection of modules 80, of the type shown in FIG. 2, with minor auxiliary components to perform an EDCT with doubled throughput on a double length data block is shown in FIG. 1, as described hereinabove.

Referring now to FIG. 2, in the apparatus 10 (FIG. 1) each EDFT module, 24, 26, 28 or 29, of FIG. 1, shown as 80 in FIG. 2, comprises means 82 for generating a signal $$e^{-\frac{i\pi s^2}{2N}},$$

$s = -(N-1), \ldots, (N-1)$. A module input multiplier 84 has two inputs, the input signal 86 and the signal $$e^{-\frac{i\pi s^2}{2N}}.$$

A transversal filter 88 has 2N-1 taps, tapped according to the relationship $$e^{-\frac{i\pi s^2}{2N}},$$

its input being connected to the output of the module input multiplier 84. The module 80 also includes a module output multiplier 89, whose two inputs comprise the output of the transversal filter 88 and the signal $$e^{-\frac{i\pi s}{2N}}.$$

In general, there are two types of transversal filters, one of which operates at base band, for example, charge coupled devices, where signals are represented by separate real samples in one device and imaginary samples in another device.

An alternative implementation for transversal filters would include surface acoustic wave (SAW) devices, which are bandpass filters. In this type of implementation, the complex attenuators would be phase shifters.

Figure 3:
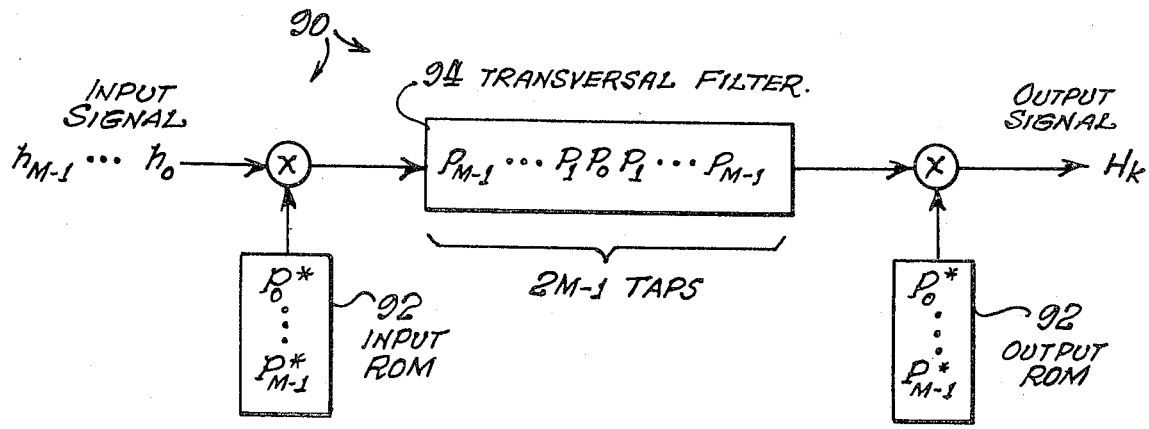
FIG. 3 is a prior art block diagram showing one implementation of the apparatus of FIG. 2.

As is shown in the embodiment 90 shown in FIG. 3, the module input and output multipliers 92 may comprise read-only memories.

The weights in the filter 94 and read-only memories 92 of the components in FIG. 3 must be defined in terms of the components in FIG. 2. However, the term 2N in the denominator of of FIG. 2 would be replaced by the letter M in FIG. 3. Comparing the P terms in FIG. 3 with the exponential terms in FIG. 2, it can be seen that P* is the complex conjugate of P.

The EDFT modules, 24, 26, 28 and 29, take the DFT of size 2N of a length N data block, extended by N zeroes. The explicit equation for such a DFT, with an input $a_n$, can be written as $$\sum_{n=0}^{N-1} a_n e^{-\frac{i2\pi kn}{2N}}.$$

DERIVATION OF THE MODULAR EDCT

Let the input data be denoted by $g_m$ for $m=0, 1, \ldots M-1$. Define the symmetrized extension of the data by $g_{-1-m} = g_m$ for $m=0, 1, \ldots M-1$. The even discrete cosine transform (EDCT) of $g$ may then be defined by any of the equivalent expressions shown in equations 1–3.

$$G_k = e^{-\frac{i\pi k}{2M}} \sum_{m=-M}^{M-1} g_m e^{-\frac{i2\pi km}{2M}} \qquad (1)$$
$$\text{for } k=0,1,\ldots,M-1$$

$$G_k = 2 \sum_{m=0}^{M-1} g_m \cos(\pi(m+.5)k/M) \qquad (2)$$
$$\text{for } k=0,1,\ldots,M-1$$

$$G_k = 2 Re\left\{ e^{-\frac{i\pi k}{2M}} \sum_{m=0}^{M-1} g_m e^{-\frac{i2\pi km}{2M}} \right\} \qquad (3)$$
$$\text{for } k=0,1,\ldots,M-1$$

Let the data block length be even, say M=2N. Then the summation in the DCT can be split into shorter sums as shown in equations 4–5.

$$G_k = 2 Re\left\{ e^{-\frac{i\pi k}{4N}} \sum_{m=0}^{2N-1} g_m e^{-\frac{i2\pi km}{4N}} \right\} =$$

$$2 Re\left\{ e^{-\frac{i\pi k}{4N}} \left\{ \sum_{n=0}^{N-1} g_{2n} e^{-\frac{i2\pi k(2n)}{4N}} + \sum_{n=0}^{N-1} g_{2n+1} e^{-\frac{i2\pi k(2n+1)}{4N}} \right\} \right\} \qquad (4)$$
$$\text{for } k=0,1,\ldots,2N-1$$

$$G_k = 2 Re\left\{ e^{-\frac{i\pi k}{4N}} \sum_{n=0}^{N-1} g_{2n} e^{-\frac{i2\pi kn}{2N}} \right\} + 2Re\left\{ e^{-\frac{i3\pi k}{4N}} \sum_{n=0}^{N-1} g_{2n+1} e^{-\frac{i2\pi kn}{2N}} \right\} \qquad (5)$$
$$\text{for } k=0,1,\ldots,2N-1$$

Each of the summations in equation 5 may be interpreted as a DFT of length 2N of a length N data block extended by N zeroes. The first N coefficients of such a DFT are computed directly by the EDFT module of FIG. 2. The remaining coefficients may all be written in the form $G_{p+N}$, where $p=0, 1, \ldots N-1$. The corresponding terms of equation 5 are examined in equations 6–9.

$$e^{-\frac{i\pi(p+N)}{4N}} = e^{-\frac{i\pi}{4}} e^{-\frac{i\pi p}{4N}} \qquad \text{for } p=0,1,\ldots,N-1 \quad (6)$$

$$e^{-\frac{i3\pi(p+N)}{4}} = e^{-\frac{i3\pi}{4}} e^{-\frac{i3\pi p}{4N}} \qquad \text{for } p=0,1,\ldots,N-1 \quad (7)$$

$$\sum_{n=0}^{N-1} g_{2n} e^{-\frac{i2\pi(p+N)n}{2N}} = \sum_{n=0}^{N-1} (-1)^n g_{2n} e^{-\frac{i2\pi pn}{2N}}$$
$$\text{for } p=0,1,\ldots,N-1 \quad (8)$$

$$\sum_{n=0}^{N-1} g_{2n+1} e^{-\frac{i2\pi(p+N)n}{2N}} = \sum_{n=0}^{N-1} (-1)^n g_{2n+1} e^{-\frac{i2\pi pn}{2N}}$$
$$\text{for } p=0,1,\ldots,N-1 \quad (9)$$

The structure shown in FIG. 1 uses equation 4 to generate the coefficients $G_0, G_1, \ldots, G_{N-1}$ and uses equations 6–9 to generate $G_N, G_{N+1}, \ldots, G_{2N-1}$.

Obviously many modifications and variations of the present invention are possible in the light of the above teachings. It is therefore to be understood that within the scope of the appended claims the invention may be practiced otherwise than as specifically described.

What is claimed is:

1. Apparatus for performing an even discrete cosine transform (EDCT) on an input signal of size 2N, with components for an EDCT of size N, comprising:

switching means, having an input and two alternately energized outputs, a first output and a second output, for distributing data points $g_0, \ldots, g_{2N-1}$ of an input signal, the last data points $g_N, \ldots, g_{2N-1}$ being made zeroes, means for generating a signal $(-1)^n$, $n = 0, 1, \ldots, 2N-1$;

a first input multiplier, whose two inputs are connected to the first output of the switching means and to the signal generating means;

a second input multiplier, whose two inputs are connected to the second output of the switching means and to the signal generating means;

a first EDFT module, whose input is connected to the output of the first input multiplier, which performs a discrete Fourier transform (DFT) on its input signal;

a second EDFT module, substantially identical to the first module, whose input is connected to the first output of the switching means;

a third EDFT module, substantially identical to the first module, whose input is connected to the second input of the switching means;

a fourth EDFT module, substantially identical to the first module, whose input is connected to the output of the second input multiplier;

a first complex attenuator, whose input is connected to the output of the first EDFT module, which shifts the phase of a signal at its input by $-\pi/4$ radians;

a second means for generating a signal, which generates a signal $$e^{-\frac{i\pi k}{4N}},$$

$= 0, 1, \ldots, 2N-1$;

a first output multiplier, whose inputs are connected to the outputs of the first phase shifters and the second signal generating means;

a second output multiplier, whose inputs are connected to the outputs of the second EDFT module and the second complex attenuator;

a second complex attenuator, whose input is connected to the output of the fourth EDFT module, which shifts the phase of a signal at its input by $-3\pi/4$ radians;

a third means for generating a signal, which generates a signal $$e^{-\frac{i3\pi k}{4N}};$$

a third output multiplier, whose inputs are connected to the outputs of the third EDFT module and the third signal generating means;

a fourth output multiplier, whose inputs are connected to the outputs of the second complex attenuator and the third signal generating means;

a first signal summer, whose two inputs are the outputs of the second and third output multipliers;

first circuit for taking the real part of an input signal, connected to the output of the first signal summer, the output signal being $G_0, \ldots, G_{N-1}$, the first N terms of the even discrete cosine transform;

a second signal summer, whose two inputs are the outputs of the first and fourth output multipliers; and second circuit for taking the real part of an input signal, connected to the output of the second signal summer, the output signal being $G_N, \ldots, G_{2N-1}$, the last N terms of the even discrete cosine transform.

2. The apparatus according to claim 1, wherein each EDFT module comprises:

means for generating a signal $$e^{-\frac{i\pi s^2}{2N}},$$

$s = -(N-1), \ldots, (N-1)$;

a module input multiplier, whose two inputs comprise the input signal and the signal $$e^{-\frac{i\pi s^2}{2N}};$$

a transversal filter, having $2N-1$ taps and tapped according to the relationship $$e^{\frac{i\pi s^2}{2N}},$$

whose input is connected to the output of the module input multiplier; and a module output multiplier, whose two inputs comprise the output of the transversal filter and the signal $$e^{-\frac{i\pi s}{2N}}.$$

3. The apparatus according to claim 2, wherein:
the module input and output multipliers comprise read-only memories.

* * * * *